W. B. CLAYPOOLE.
BULL WHEEL FOR WELL RIGS.
APPLICATION FILED MAR. 30, 1908.
917,412.
Patented Apr. 6, 1909.
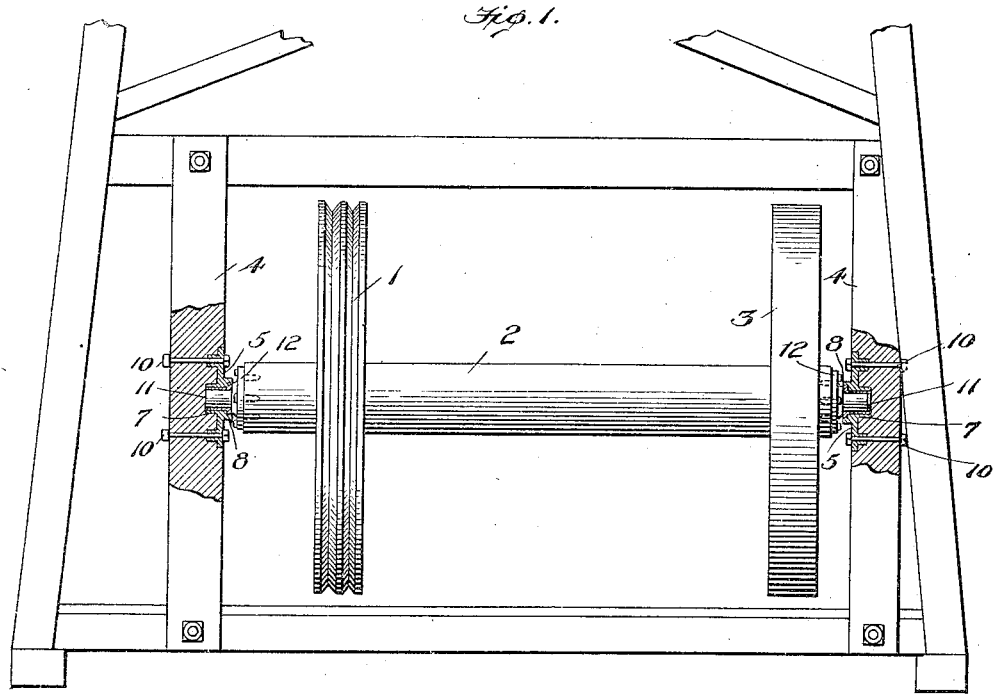
Fig. 1.
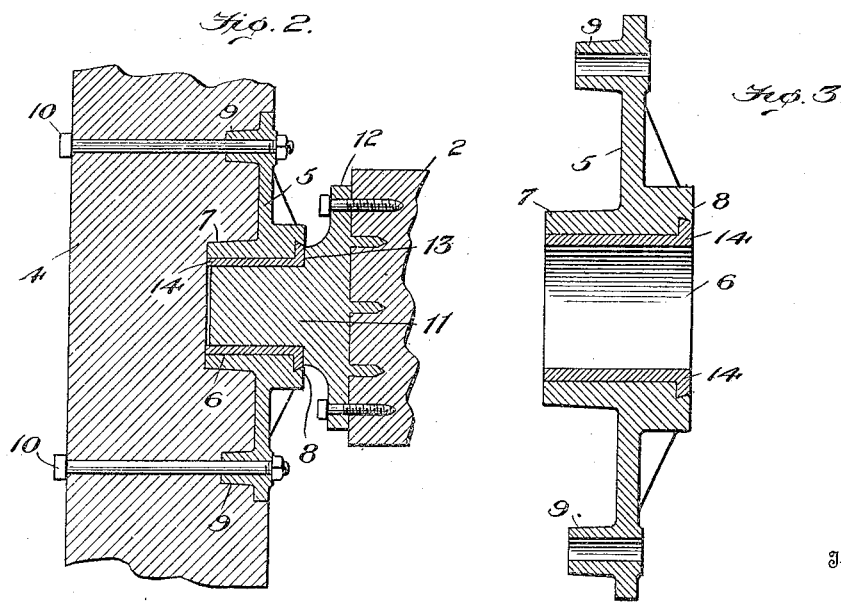
Fig. 2.
Fig. 3.
Witnesses
Edwin L. Bradford
Anne B. Johnson
Inventor
Walton B. Claypoole
By Johnson & Johnson
Attorneys

UNITED STATES PATENT OFFICE.

WALTON B. CLAYPOOLE, OF KITTANNING, PENNSYLVANIA, ASSIGNOR OF ONE-HALF TO EDWIN G. JACK, OF KITTANNING, PENNSYLVANIA.

BULL-WHEEL FOR WELL-RIGS.

No. 917,412.     Specification of Letters Patent.     Patented April 6, 1909.

Application filed March 30, 1908. Serial No. 424,078.

*To all whom it may concern:*

Be it known that I, WALTON B. CLAYPOOLE, a citizen of the United States, residing at Kittanning, in the county of Armstrong and State of Pennsylvania, have invented certain new and useful Improvements in Bull-Wheels for Well-Rigs; and I do hereby declare the following to be a full, clear, and exact description of the invention, such as will enable others skilled in the art to which it appertains to make and use the same.

By reason of the high speed in suddenly and swiftly lowering the heavy tool in the operation of drilling oil and Artesian wells, the bull-wheel of the operating shaft is subjected to racking strain and sudden and swift jerking actions on its gudgeons and their bearings in the standards of the rig, rendering the gudgeons liable to be torn off the shaft causing the wheels to get away, drop the tool and thereby cause the drill hole to be plugged. The rapid rotation of the wheel also produces rapid wear of the shaft gudgeons and their bearings in the rig standards and the enlargement of the bearings caused by such wear will cause a vertical jumping and end play of the bull-wheel shaft rendering it dangerous for the workman and liable to cause the cable which operates the boring tool to be displaced from the groove of the bull-wheel.

So far as I know and can find the bull-wheels now in use are journaled in holes in wooden posts, which, for this purpose, are made of white oak and the gudgeon holes not only wear but are liable to be burned by the heat of the gudgeons due to the friction from rapid rotation, and in such cases the wheel supporting posts must be frequently replaced by new ones.

My improvement is directed to means whereby the mounting of the bull-wheel shaft is rendered firm and durable and caused to have a steady and safe movement under high speed, and in the claim appended hereto the precise improvement will be set out in connection with the accompanying drawings, in which,—

Figure 1 represents in elevation so much of the derrick as shows the bull-wheel mounted therein the shaft mounting bearings being shown in section. Fig. 2 is an enlarged section of a portion of the bull-wheel shaft, a portion of the rig-post and the shaft mounting bearings. Fig. 3 shows the gudgeon bearing casting in section enlarged with its interior and outside vertical wear-facing.

The derrick or rig structure, the bull-wheel 1 and its shaft 2, may be of any suitable construction including the brake-wheel 3, and the bull-wheel may be mounted near one end of the shaft and the brake-wheel near its other end. The bull-wheel shaft is mounted in separate standards 4—4 in the rig-frame, and my improved mounting bearings for the shaft are in these standards and consists of a standard bearing casting as a new article of manufacture having an interior and outside vertical wear facing of Babbitt metal. The standard bearing consists of a plate 5, having a circular hub which projects on each side of the plate and has a central opening 6, and forms the bearing for the shaft gudgeon. The standard is recessed to receive the plate and its hub projection 7; while the projection on the other side of the plate forms an embedded face bearing 8, around the central opening for a purpose to be presently stated. Each end of the bearing plate has a boss 9, seated in a recess in the post and through openings in these bosses nutted bolts 10, are passed through the standards securing the bearing plate in the standard recess so that the face bearing 8 projects from the standard.

The gudgeon 11, is adapted to closely fit the bearing surface of the standard hub plate and has a base of two surface parts of unequal diameters the base part of 12, of greatest diameter being bolted to the end of the bull-wheel shaft and the stepped part of least diameter from which the gudgeon projects, forms a flat face bearing 13, which abuts against an embedded wear face, of the standard bearing plate. By this construction the gudgeon connection with its shaft, is reinforced and the bull-wheel shaft at each end has its vertical gudgeon bearing 13, corresponding to the vertical bearing 8, of the hub-plate the effect of which is to prevent endwise movement of the shaft on its gudgeons, give a steady working of the shaft and diminish the liability of the gudgeons to break off.

The bearing face of the hubbed casting is formed with an annular recess which extends with an increased diameter into the vertical face 8, and this recess is filled with Babbitt metal 14 and forms thereby a continuous bearing for the journal of the shaft and a vertical bearing face 8, for the vertical bearing 13, of the shaft gudgeon.

In case the gudgeons and the metal babbitt bearings become worn the Babbitt metal can be re-surfaced or re-filled, but I have found the wear practically unnoticeable and, as there is no wear upon the standards the bull-wheel shaft is made a permanent structure to which the co-acting horizontal and vertical shaft bearing surfaces contribute.

As there is great weight and a powerful downward thrust on the bull-wheel shaft, it is important to note that this is provided for by the end bosses 9, on the hubbed bearing-plate, and the seating of the plate in a recess in the standard which coöperate with the fastening bolts.

The important matter in a bull-wheel is to maintain a close endwise fitting of the gudgeons in their bearings to prevent wear and consequent jumping and knocking of the shaft, and for this purpose my improvement not only lessens lengthwise but endwise wear of the bearings.

In erecting the wheel the shaft is mounted in its bearings with its vertical gudgeon shoulders in contact with the vertical shoulders of the hub bearing plate, and so long as this contact is maintained there will be no jumping or knocking of the shaft in its bearings. Another advantage of these vertical face bearings is that they allow the Babbitt metal lining of the bearing plate to be extended into its vertical face and thus reduce the wear to a minimum and when it is considered that the fall of the tool tends to give a rapid jerky rotation to the wheel, it is apparent that if the shaft had endwise play it would tend to increase the wear of the gudgeons and the danger in the operation. To re-inforce the screw fastenings by which the base-plate of each gudgeon is secured, the plate may be formed with short pointed studs 15, which, in centering the gudgeons are driven into the ends of the shaft.

I claim:

In a bull-wheel rig, the combination of a bearing-box consisting of a plate having fastening bosses and a hub projecting at both sides of the plate, there being an undercut recess at one end of the hub, a bushing in the hub having a shoulder extending into the recess, and a gudgeon having a shoulder coöperating with the shoulder on the bushing to prevent wear between the plate and the gudgeon.

In testimony whereof I have signed my name to this specification in the presence of two subscribing witnesses.

WALTON B. CLAYPOOLE.

Witnesses:
J. D. STITT,
S. H. RICHARDSON.